United States Patent [19]
Bist et al.

[11] Patent Number: 6,043,844
[45] Date of Patent: Mar. 28, 2000

[54] PERCEPTUALLY MOTIVATED TRELLIS BASED RATE CONTROL METHOD AND APPARATUS FOR LOW BIT RATE VIDEO CODING

[75] Inventors: Anurag Bist; Parthasarathy Sriram, both of Irvine, Calif.

[73] Assignee: Conexant Systems, Inc., Newport Beach, Calif.

[21] Appl. No.: 08/802,042

[22] Filed: Feb. 18, 1997

[51] Int. Cl.[7] .................................................... H04N 7/12
[52] U.S. Cl. .......................................... 348/390; 348/384
[58] Field of Search .................................... 348/384, 390, 348/400, 405, 419; 386/27, 109, 111–112; 382/239, 244, 247

[56] References Cited

U.S. PATENT DOCUMENTS

| | | | |
|---|---|---|---|
| 5,321,725 | 6/1994 | Falk et al. ................................. | 375/39 |
| 5,524,025 | 6/1996 | Lawrence et al. ...................... | 348/403 |
| 5,778,192 | 7/1998 | Schuster et al. ........................ | 348/390 |

OTHER PUBLICATIONS

Anurag Bist and Parthasarathy Sriram, "Constrained Trellis Based Rate Control Scheme For Low Bit Rate Video Coding".

Anurag Bist and Parthasarathy Sriram, "A Perceptually Motivated Constrained Trellis Based Rate Control Scheme for TMN Video Codec".

Atul Puri and R. Aravind, "Motion–Compensated Video Coding with Adaptive Perceptual Quantization".

Antonio Ortego, and Kannan Ramchandram, "Forward–adaptive quantization with optimal overhead cost for image and video coding with applications to MPEG video coders".

Wei Ding and Bede Liu, "Rate–Quantization Modeling for Rate Control of MPEG Video Coding and Recording".

Ortega et al, "Optimal Trellis–Based Buffered Compression and Fast Approximations", IEEE Trans. on Image Processing, vol. 3, No. 1, pp. 26–40, Jan. 1994.

Marcellin et al, "Transform Coding of Monochrome and Color Images Using Trellis Coded Quantization", IEEE Trans. on Circuits and Systems for Video Technology, vol. 3, No. 4, pp. 270–276, Aug. 1993.

Joshi et al, "Image Subband Coding Using Arithmetic Coded Trellis Coded Quantization", IEEE Trans. on Circuits and Systems for Video Technology, vol. 5, No. 6, pp. 515–522, Dec. 1995.

Sementilli et al, "Progressive Transmission in Trellis Coded Quantization–Based Image Coders", IEEE, pp. 588–591, Jul. 1997.

Oh et al, "A VLSI Architecture of the Trellis Decoder Block for the Digital HDTV Grand Alliance System", IEEE Trans. on Consumer Electronics, vol. 42, No. 3, pp. 346–356, Aug. 1996.

Ito et al, "A Wavelet Video Coder Using Entropy–Constrained Trellis Coded Quantization", IEEE, pp. 598–601, Sep. 1995.

Laroia et al, "On TB–SVQ Based Motion Compensated DCT Coding of VideoConference Sequences", IEEE, pp. 448–451, 1994.

*Primary Examiner*—Vu Le
*Attorney, Agent, or Firm*—Akin, Gump, Strauss, Hauer, & Feld, L.L.P.

[57] ABSTRACT

A method and apparatus for compressing and transmitting variable amounts of video data in real time over a channel having a fixed bandwidth. A trellis having a plurality of nodes is provided. Each of the plurality of nodes has an associated quantization parameter and bit number. The bit number associated with each node corresponds to a quantity of bits consumed in reaching that node. For each of the plurality of blocks, a minimum path through the trellis is selected. A quantization parameter associated with the selected minimum path is selected. A number of bits is assigned to each of the plurality of blocks in accordance with the selected quantization parameter. A substantially fixed number of bits is distributed among the plurality of blocks which make up each of the plurality of frames in accordance with the selected quantization parameter. The number of bits per frame is substantially constant for each of the plurality of frames, and the distribution of bits within each of the plurality of frames varies in accordance with the content of the frame.

20 Claims, 6 Drawing Sheets

ADAPTIVE RATE DISTORTION MODELING

A CONSTRAINED TRELLIS GROWTH IN THE CONTEXT OF THE CHANGES IN THE QUANTIZATION STEP SIZE

*ADAPTIVE RATE DISTORTION MODELING*

PERCEPTUALLY MOTIVATED TRELLIS BASED RATE CONTROL METHOD AND APPARATUS FOR LOW BIT RATE VIDEO CODING

FIELD OF THE INVENTION

The present invention relates to a method and apparatus for coding video signal sequences in real time. In particular, the present invention relates to a method and apparatus for coding video data that is particularly well suited for low bit rate transmission systems, such as telephone lines (e.g. video telephony), ISDN lines (video conferencing), video mail, etc.

BACKGROUND OF THE INVENTION

In the transmission of a video signal over a fixed channel, the amount of data that must be coded and transmitted may vary for each video frame of a video sequence. Therefore, the coding and transmission method must be capable of handling variable amounts of data. Transmission of variable bit rate video over a fixed rate channel is an important problem for any codec which transmits variable length codes over the channel. Most of the existing standards in video belong to this class of coders.

Transmission of a variable rate bitstream over a fixed rate channel requires a buffer to regulate the bitstream being generated by the quantization process. The buffer must have a capacity that is large enough to handle at least one frame. Because the amount of data per frame may vary, the buffer must be large enough to handle the frame having the largest amount of data. A rate control mechanism is used to prevent the buffer from underflowing or overflowing by maintaining the output bitstream within a limited range. This may be achieved by controlling the quantization step size used in the coding loop. A larger quantization step size generally corresponds to a coarser quantization and smaller bit rate at the output. A smaller quantization step size generally corresponds to finer quantization and a larger bit rate at the output. Each time the quantization step size within a frame is changed, additional bits must be sent to the decoder to inform the decoder of the change. By changing the quantization step size, the number of bits required in coding a particular frame of a video sequence can be adjusted. The goal of most rate control methods is to minimize fluctuations in the bit rate, and thereby stabilize output quality, by maintaining a constant distortion over different blocks of a frame or different frames of a given sequence.

Until recently, most work on rate control has concentrated on higher bit rates like MPEG. (See, for example, A. Ortega and K. Ramchandran, "Forward adaptive quantization with optimal overhead cost for image and video coding with applications to MPEG video coders," Proceedings of IS&T/SPIE, Digital Video Compression, San Jose, Calif., February 1995; W. Ding and B. Kiu, "Rate-Quantization Modeling for Rate Control of MPEG Video Coding and Recording," Proceedings of IS&T/SPIE, Digital Video Compression, San Jose, Calif., February 1995). More recently, attempts have been made to extend this problem to lower bit rates (See, for example, A. Bist and P. Sriram, "A Perceptually Motivated Constrained Trellis Based Rate Control Scheme for TMN Video Codec," Rockwell Signal Processing Conference, Thousand Oaks, Calif., April 1995; T. Weignand, M. Lightstone, T. G. Campbell and S. K. Mitra, "Rate-Distortion Optimized Mode Selection for Very Low Bit Rate Video Coding and the Emerging H.263 Standard," pre-print, July 1995).

Several approaches have been proposed to attack the problem of bit rate control. One method considers the problem as a feedback control problem. Another approach views the problem of bit rate control as a constrained optimization problem. This approach has been used to assign bits among different frames in MPEG encoding. A third approach attempts to model the distortion-rate functions of the video sequences and use these models in assigning bits among different frames (See, for example, A. Puri and R. Aravind, "Motion Compensated Video Coding with Adaptive Perceptual Quantization," IEEE Transactions on Circuits and Systems for Video Technology, Vol. 1, No. 2, pp. 351–3361, December 1991).

As transmission bit rates decrease and buffer size remains limited, the need for a good rate control method for video becomes more acute. Standard linear rate control methods suffer from low performance and frame jerkiness. Most known methods are simplistic and fail to provide efficient distribution of bits within portions of one frame and between different frames.

It is an object of the present invention to provide an efficient and judicious method and apparatus for compressing, transmitting and decoding large amounts of video image data for frames of a moving image, and for doing so over a telephone line having a limited bandwidth and in accordance with International Telecommunications Union (ITU) standards for video compression algorithms, including H.261 (for ISDN lines) and H.263 (for telephone lines).

SUMMARY OF THE INVENTION

In accordance with the present invention, these and other objectives are achieved by providing a rate control method and apparatus for very low bit rate video coding that is particularly useful for purposes of visual telephony.

In its preferred embodiment, the present invention uses certain characteristics of the source to produce a delayed decision rate control method. The present invention uses motion information and perceptual information from the source to optimize the rate assignment. Given a fixed bit rate for a video sequence, different portions of each frame are assigned bits to be used in compressing those portions. Different parts of the frame have different complexity. The invention finds a globally optimal allocation of bits for different parts of the frame, which is optimized for the complexity of the part, given that the overall rate is fixed and there is a fixed buffer size. Rate distortion information is combined with the perceptual activity of different parts of a frame to produce a distortion measure which is then used in a constrained trellis search derived from the syntax of the H.263 algorithm to get the bit allocation for each frame. Since the rate distortion calculations are performed beforehand, the complexity of the method is minimized and is equal to the complexity of one trellis search.

In its preferred embodiment, the present invention addresses the rate allocation problem as a constrained optimization problem. However, in contrast to known methods, the present invention uses a constrained trellis to perform the optimization. Furthermore, the present invention is able to reduce the computations in the trellis search by modeling the rate distortion functions, and by performing a motion based classification. The resulting bit allocation yields a higher signal to noise ratio, and a better correlation between the quantization step size and the block energies, with respect to the linear rate control method for the same number of bits assigned for a particular frame. In a preferred embodiment, the present invention may be optimized for a video coder conforming to the H.263 algorithm (which algorithm is described, for example, in Video Coding for Low Bitrate Communication, Draft Recommendation H.263, ITU Telecommunication Union, Telecommunications Standardization Sector SG 15, December 1995).

The present invention provides both improved visual performance and reduced frame jerkiness at the output when compared with known linear rate control methods. The rate control method in accordance with the present invention is suitable for variable bit-rate coders which could also be variable frame rate coders.

BRIEF DESCRIPTION OF THE DRAWINGS

A detailed description of a preferred embodiment of the present invention will be made with reference to the accompanying drawings.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention. The scope of the invention is best defined by the appended claims.

Figure 1:
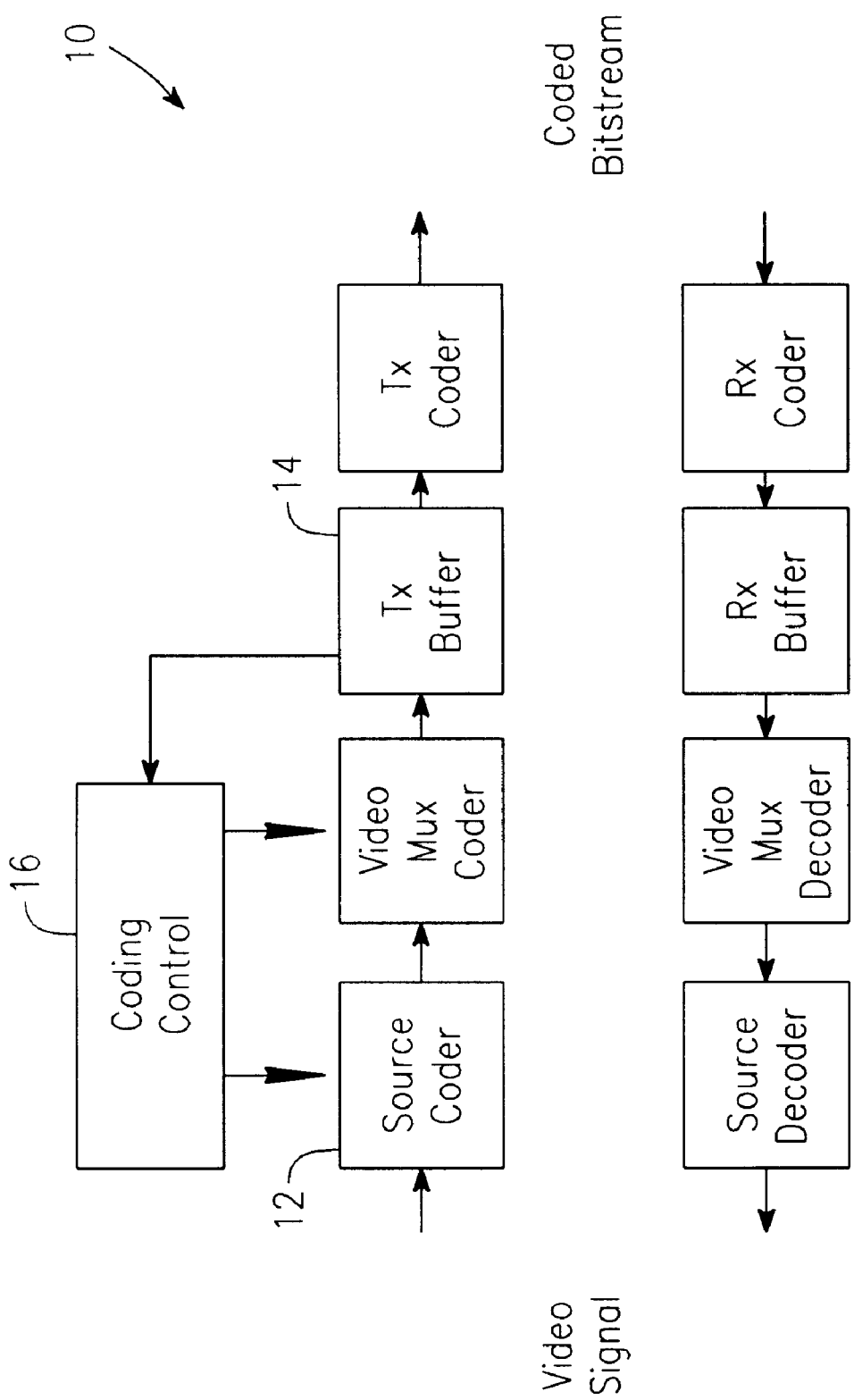
FIG. 1 shows an example of a block diagram of a video codec.

In the preferred embodiment of the present invention described below, the rate control problem is described in the context of the H.263 algorithm. FIG. 1 shows a block diagram of an H.263 video coder 10. A source coder 12 generates variable length bitstreams which go into a transmission buffer 14 before being sent to a constant bit rate channel. The present invention is concerned with efficiently designing the coding controller 16 so that the output of the transmission buffer has a relatively fixed length per unit of time, while maintaining a good image quality. The coding controller 16 will determine, depending on the past history of the buffer and the estimate of the complexity of the current portion of image being quantized, the correct number of bits to be allocated for that portion of the image. The number of bits assigned for a particular portion is controlled by monitoring the quantization step parameter, QP, in the coding algorithm.

A video sequence consists of several frames, which in turn consists of several different macroblocks. A macroblock refers to a 16×16 block of luminance data along with two 8×8 chrominance blocks. The syntax of H.263 allows and encourages changing the quantization step size on a macroblock level. For a QCIF resolution sequence consisting of 176×144 pixels per frame, there are 99 macroblocks per frame. Each time the quantization step size within a frame is changed, an additional two bits must be sent to the decoder to inform the decoder of the change. Furthermore, changing the step size too often results in variable quality over different parts of one frame, which is undesirable. Therefore, a good rate control method should preferably take into account these tradeoffs.

One known method of assigning bits in a variable fashion is by using a linear rate control mechanism. In this known linear rate control method, the quantization step size is changed at the beginning of each macroblock row in a linear way, based on the fraction of macroblocks coded. The equation which describes the changes in the quantization step size or parameter, QP, is given by:

$$QP_{new} = QP_{avgi-1}\left(1 + \frac{\Delta_1(B)}{2B_{avg}} + \frac{12\Delta_2(B)}{R}\right)$$

where $$\Delta_1(B) = B_{,i-1} - B_{avg} \text{ and } \Delta_2(B) = B_{1,mb} - \frac{mb}{MB}B_{avg}$$

and $B_{i-1}$ represents the number of bits used in coding the frame (i−1), $B_{avg}$ represents the mean number of bits per frame, $B_{i,mb}$ represents the number of bits used in coding the first mb macroblocks of the frame i, and MB represents the total number of macroblocks in one frame.

One problem with the linear rate control method is that it fails to perform a delayed decision while allocating bits for different parts of one frame. Furthermore, the linear rate control method does not take into account the local importance or difficulty of macroblocks while performing the rate allocation. As a result, an optimal rate allocation is not achieved.

These problems are overcome in accordance with a preferred embodiment of the present invention by providing a rate control method based on a delayed decision mechanism which makes a decision for bits for different macroblocks by looking at the past history of the macroblocks within a frame. The following paragraphs describe how a preferred embodiment of the present invention may be used to solve the rate control problem using a constrained trellis motivated by the syntax of the H.263 algorithm.

In accordance with a preferred embodiment of the present invention, the rate control problem is characterized as a constrained minimization problem. The objective is to minimize the overall distortion incurred in coding one frame, while imposing a bit constraint that requires the overall number of bits to remain below a certain number. In this context, the problem may be formulated as follows:

Let $D_i$ denote the distortion incurred in coding N consecutive macroblocks of one frame of a sequence. Let $R_i$ represent the corresponding rate. Furthermore, let $B_{max}$ represent the maximum number of bits allowed for one frame, L represent the number of stages before a decision on bit assignment is reached, and R represent the average rate in bits for coding N consecutive macroblocks. Then for the k-th stage (1<k<L), the constrained minimization problem can be stated as:

$$\min\left(\Sigma_i^k D_i\right)$$

subject to $$\sum_{i}^{k} R_i - (k-1) \times R \leq B_{max}$$

for each k where k=1, 2, ..., L. It is known that solving such a constrained minimization problem is equivalent to solving the following unconstrained minimization problem:

$$\min(F\lambda,k)$$

where $$F(\lambda, k) = \sum_{i}^{k} D_i + \lambda \times \left( \sum_{i}^{k} R_i - (k-1) \times R - B_{max} \right)$$

for each k, where k=1, 2, ..., L.

The solution of this problem can be obtained by searching through a trellis. If a bit allocation is found for some value of $\lambda$ ($0<\lambda<\infty$), then this allocation is also the optimal bit allocation for the constrained problem. One method of finding an optimal A is described, for example, in Y. Shoham and A. Gersho, "Efficient Bit Allocation for an Arbitrary Set of Quantizers," IEEE Transactions of Acoustics, Speech, and Signal Processing, Vol. 36, No. 9, pp. 1445–1453, September 1988. It is noted that faster suboptimal methods for finding lambda $\lambda$ are known, and the present invention is not restricted to one specific method or algorithm for finding $\lambda$.

One problem with a trellis search is the complexity involved in populating the trellis. This complexity depends upon the number of paths that each stage of the trellis can have, and the way in which one decides to choose the parameters (in this case, the distortion D and the corresponding rate R) of the trellis search.

Figure 2:
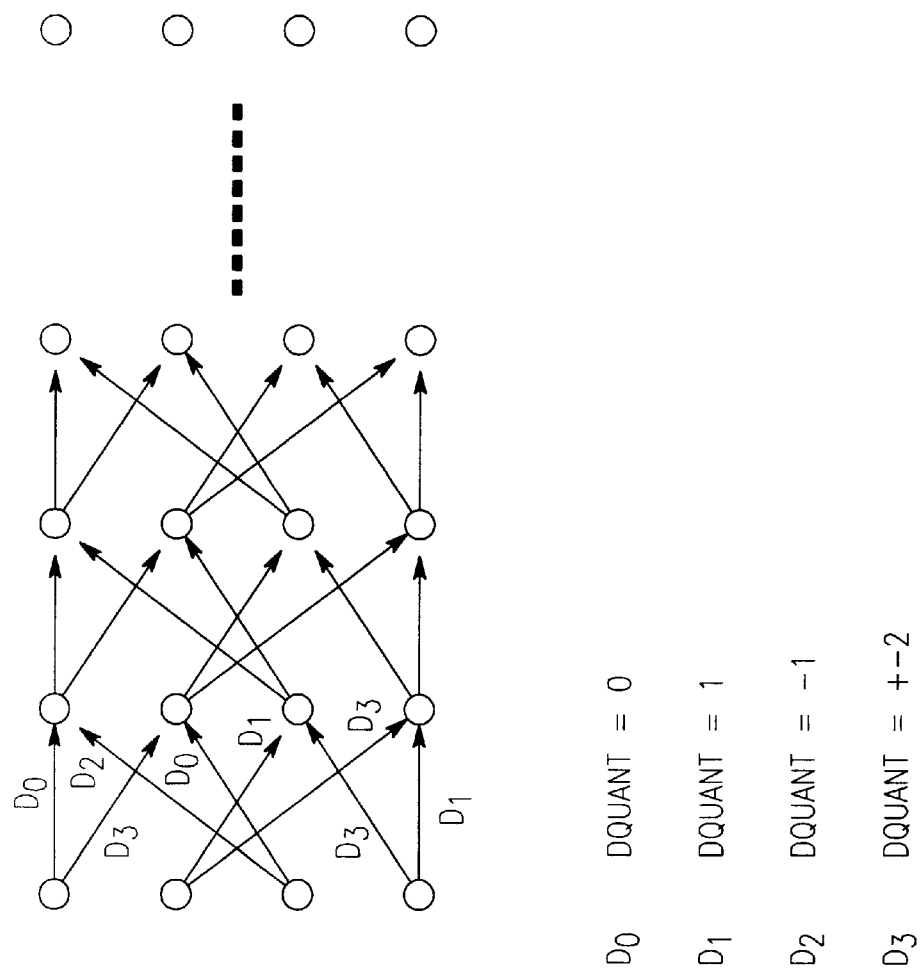
FIG. 2 shows an example of a constrained trellis motivated by the syntax of the H.263 algorithm.

The syntax of the H.263 algorithm restricts the changes in the quantization step size to ±2, ±1 and 0. This information may be used to build a constrained trellis, an example of which is shown in FIG. 2. Each node of the trellis may be associated with a quantization step size or parameter (QP) and a corresponding node bit number, which is the number of bits consumed in reaching that stage. For each value of $\lambda$, a search may be performed for the minimum path in the trellis. If a solution exists, then it is the solution being sought. Each path has an associated cost which depends on the rate and distortion associated with the quantization parameter QP corresponding to the parent node.

Theoretically, the optimal solution (that is, the optimal distribution of bits) could be obtained by using a so-called unconstrained trellis. An unconstrained trellis would comprise all possible quantization step sizes as states. In other words, at each instant of time any quantization step size would be allowed to occur. An unconstrained trellis would thereby include all of the possible paths allowed in the trellis. These paths, in their totality, would correspond to all of the possible quantization step sizes, and would not be restricted by the four states shown, for example, in FIG. 2. By allowing all quantization step sizes and all possible paths, both complexity and flexibility are increased.

The distortion D and the corresponding rate R are the parameters of the trellis which determine the costs associated with each transition. There are many ways by which these parameters may be calculated. One brute force approximation is to use a training procedure to obtain the distortion D and the rate R for each value of the quantization parameter QP. An operational rate-distortion curve obtained from training on different sequences may thereby be used to obtain a (D,R) pair for each quantization parameter QP. Subsequently, the rate distortion model may be modified to fine tune the system to operational rates. A more sophisticated method is to model the distortion D and the rate R by assuming Laplacian or Generalized Gaussian distributed transform coefficients.

To incorporate the changes in scenes and the difference in motion within different portions of a frame, a method of classification based on motion energy may be used. Such a classification can be incorporated on a real time basis. Such a motion energy based classification method, coupled with the appropriate distortion rate modeling, gives considerable improvement in the overall rate control method.

Figure 3:
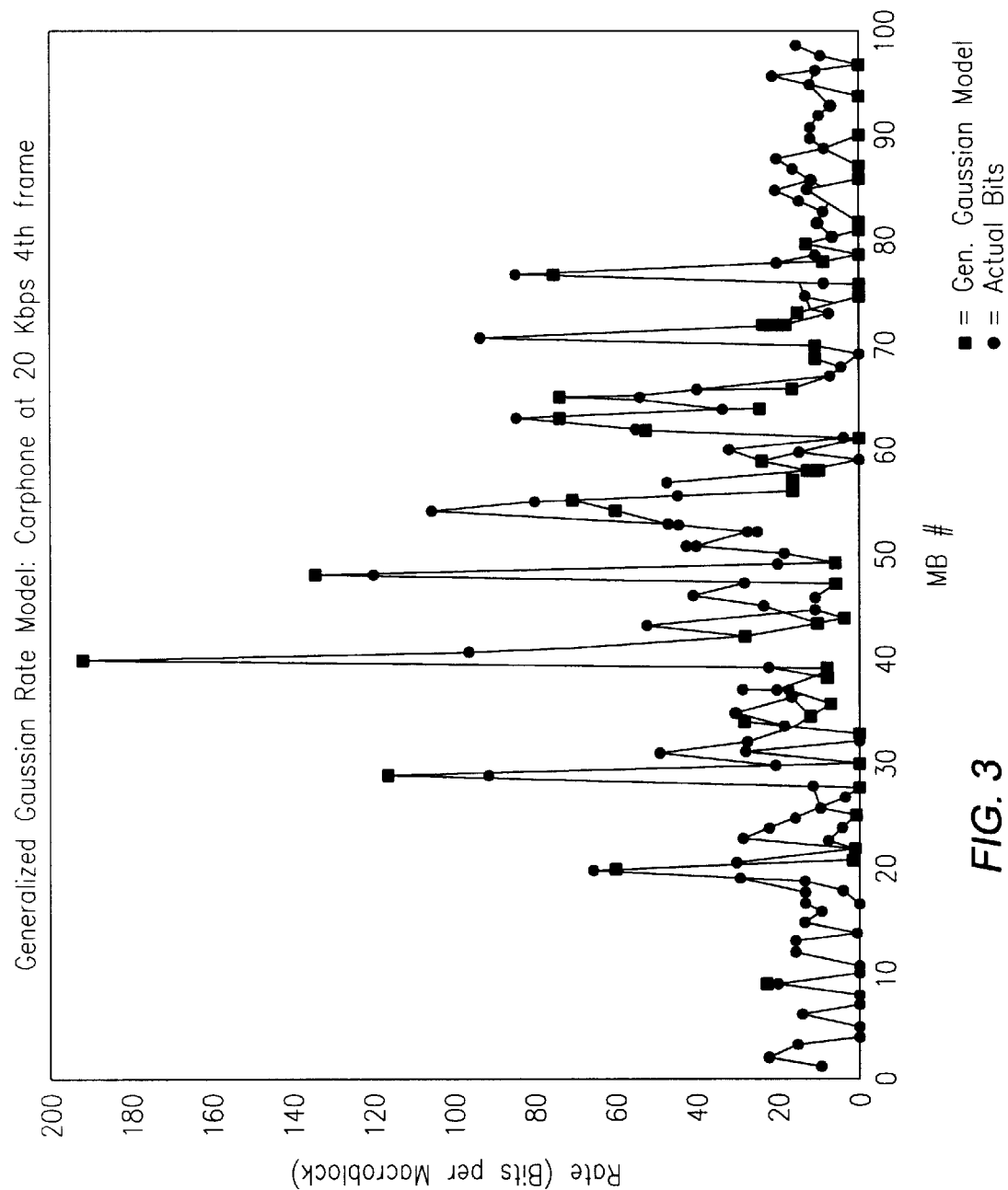
FIG. 3 shows an example of the predicted and actual rates per macroblock for one frame in a stochastic model for rate and distortion.

Stochastic modeling of the rate-distortion functions may also be performed. In one model, a Generalized Gaussian rate-distortion curve may be mapped for different energies and different quantization step sizes. Depending on the energy of the block being quantized and the step size of the quantizer, a (D,R) pair may be adaptively assigned to a block. FIG. 3 shows an example of stochastic modeling for rate and distortion. The graph shows the predicted and actual rates per macroblock for one frame. In the example illustrated in FIG. 3, the correlation coefficient between the predicted and actual rates is 0.864.

Figure 6:
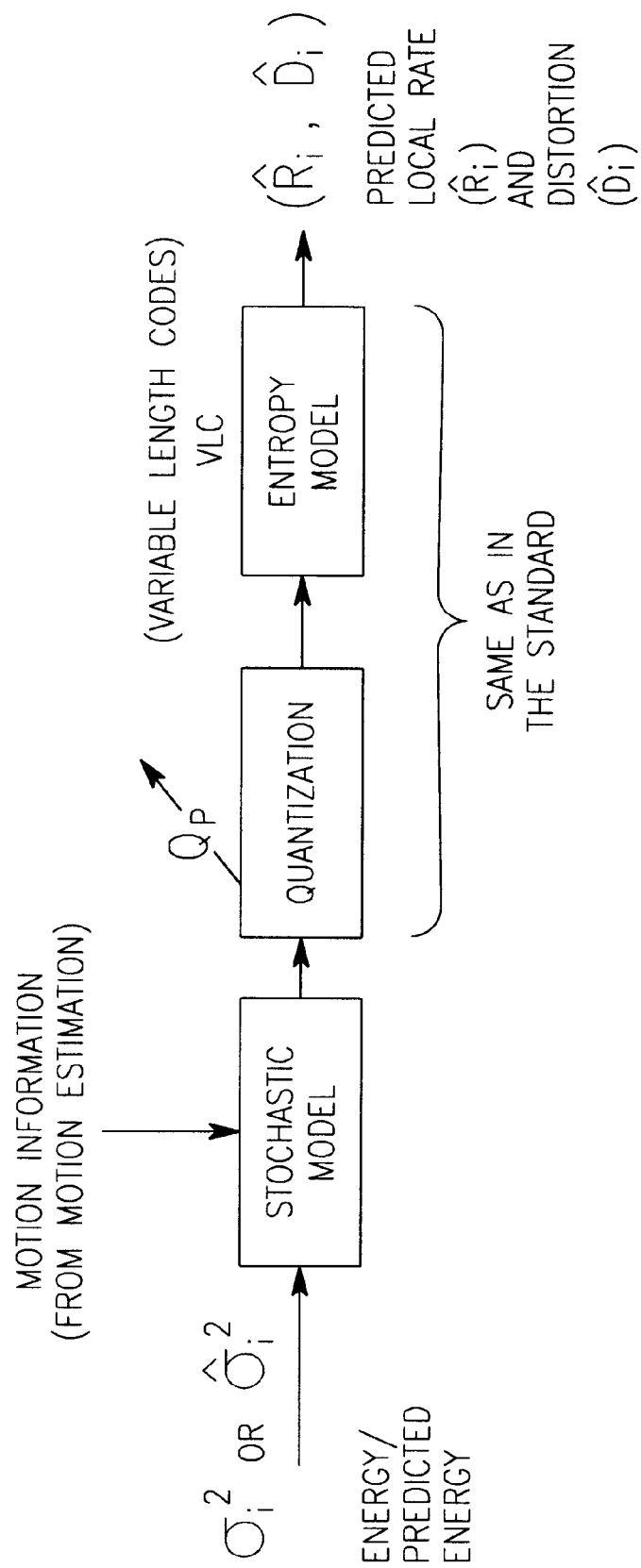
FIG. 6 shows an example of an adaptive rate distortion modeling method.

In one embodiment, a (D,R) pair for each macroblock in a frame may be obtained by an adaptive rate distortion modeling method, an example of which is illustrated schematically in FIG. 6. As shown in FIG. 6, the adaptive rate distortion modeling method may be characterized as having three basic steps: (1) stochastic modeling; (2) selection of a quantizer; and (3) entropy modeling. The illustrated method provides very accurate local rate distortion prediction, and allows the amount of bits specified for each part of a frame to be suitably matched with the complexity of that part of the frame.

For example, each image may be divided into 99 macroblocks. Each of the 99 macroblocks may be identified by an index i between 0 and 98. An associated energy ($\sigma^{i2}$) or an associated predicted energy ($\sigma_i^2$) may be determined for each macroblock i. The (D,R) pair for the ith macroblock may be obtained by the adaptive rate distortion modeling method illustrated in FIG. 6. This method may be repeated to obtain the (D,R) pair for each macroblock in the frame. The (D,R) values may then be used in a trellis and a rate allocation obtained for the entire frame.

The stochastic modeling approach provides an estimated (D,R) pair for data corresponding to the source data. In other words, if one knows an estimate of the probability density function of the source (the incoming video data), then deterministic probability density functions may be used to model the source and provide, for a given energy, an estimated rate and distortion value for that probability density function.

It is known that video coding algorithms may include some perceptual modeling or perceptual coding in the coding algorithm. Such perceptual modeling or perceptual coding methods are known to those of ordinary skill in the relevant art. Such perceptual modeling or perceptual coding may also be included as part of the step of stochastic modeling.

In the illustrated embodiment, information about motion activity from the motion estimation, together with energy information, is used to change the quantizer. In some video coding algorithms, the entire motion estimation for the entire frame may be done prior to doing the actual encoding, that is prior to doing quantization and entropy coding.

After the data is obtained it is quantized with a given quantizer. In other words, the quantization step size is varied depending on the particular quantizer for the particular macro block. The quantizer and entropy models used may correspond to those given in the H.263 and H.261 video telephony and video conferencing standards. In such a case, the quantization parameter QP could vary between 1 and 31, with a QP of 1 be a relatively fine quantizer and a QP of 31 being a relatively coarse quantizer.

The following paragraphs describe the results of the constrained trellis based rate control method in accordance with a preferred embodiment of the present invention and compare it with the known linear rate control method at low bit rates.

In the encoding procedure, the quantization parameter QP is allocated once for every N×L blocks. If N×L=MB, where MB is the total number of macroblocks in one frame, then bits are assigned for every set of N macroblocks of one frame each time. For example, if N=1, then the quantization parameter QP is being allowed to change for each macroblock.

Figure 4:
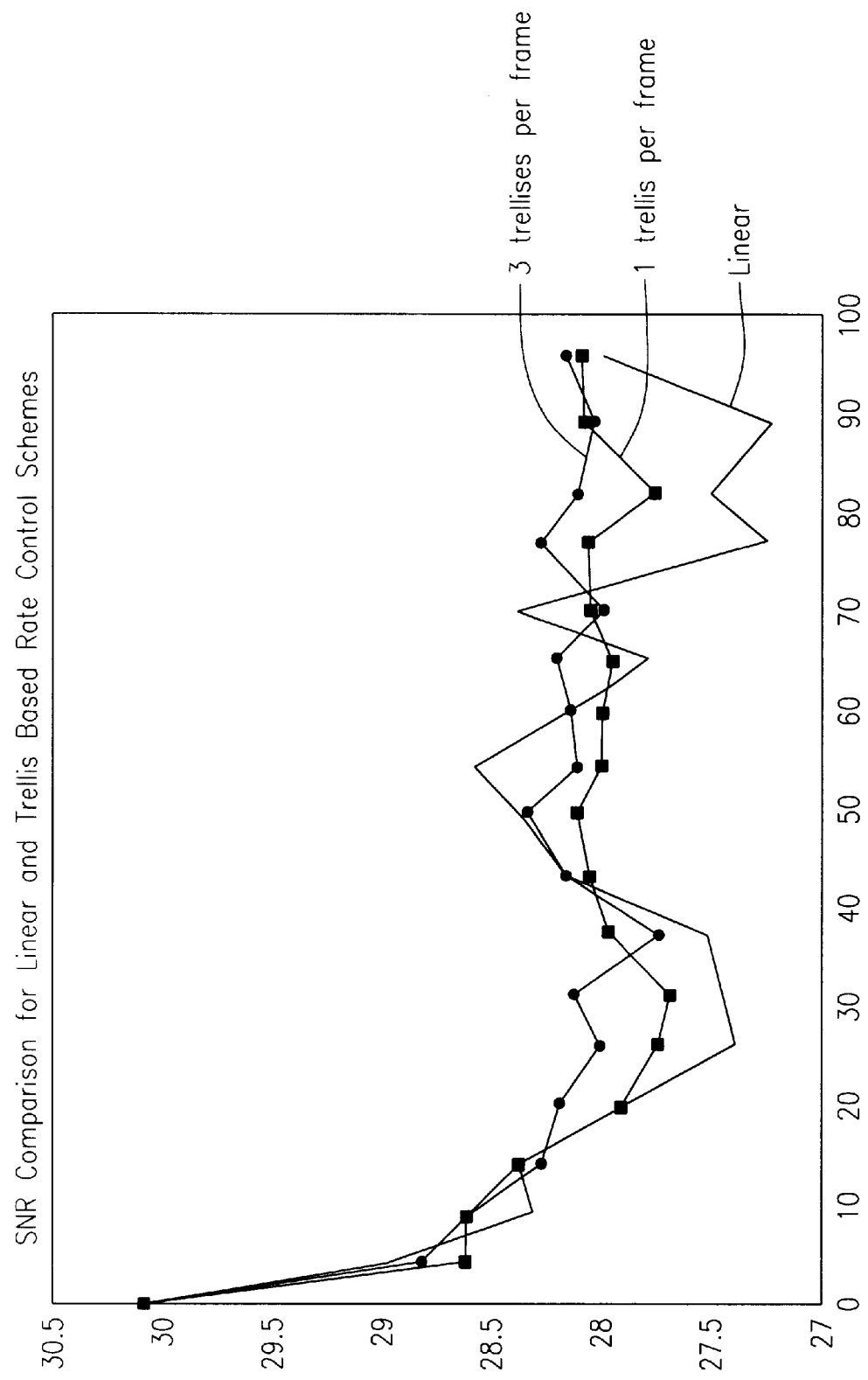
FIG. 4 shows an example of a snr comparison for linear and trellis based rate control of the first 100 frames of an sample video sequence at 10 kbps.

FIG. 4 shows an example of a snr comparison for linear and trellis based rate control methods. The figure shows coding of the first 100 frames of a sample video sequence at 10 kbps. FIG. 4 gives the comparative PSNRs of coding the sample video sequence with trellis based methods with two different depths of trellises, and the linear rate control method. As shown in FIG. 4, the fluctuation in PSNRs in the trellis based methods are less than in the linear rate control method. This indicates that a more consistent quality is achieved by using a trellis based rate control method.

To have a better control over the final frame rate, the optimization criteria may be modified by associating a dependence of block energy on the rate attributed to the quantization of that macroblock. The unconstrained optimization is now done to minimize $$\left(\Sigma_i \left(D_i \times \sigma^2 + \lambda \times \frac{1}{\sigma^{\frac{1}{n}}} \times R_i\right)\right),$$

where $\sigma^2$ represents the variance of the current macroblock and n represents a parameter which gives the control over the frame rate.

Figure 5:
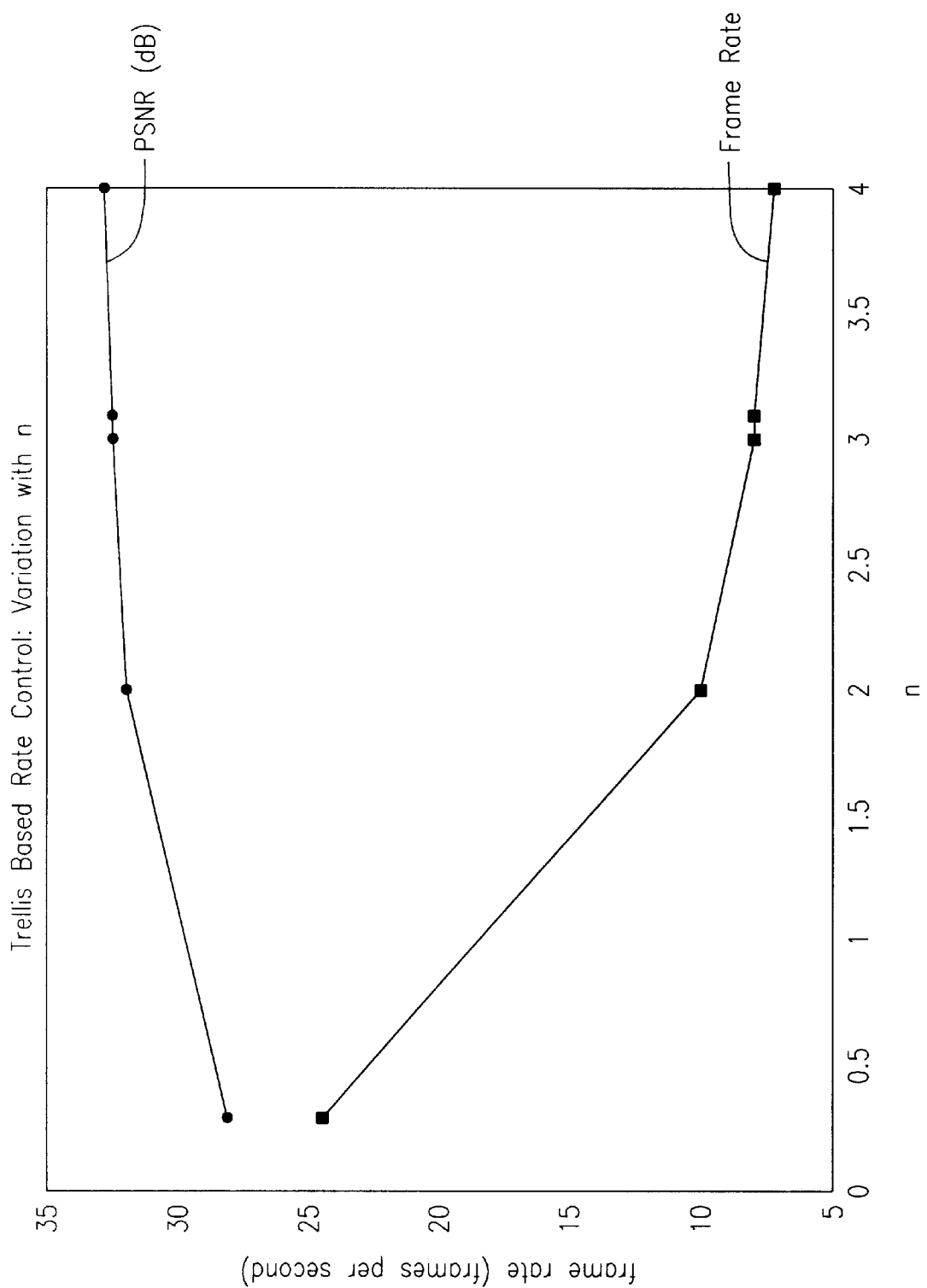
FIG. 5 shows an example of a variation of average psnr and average frame rate versus the parameter n for a sample video sequence.

FIG. 5 shows an example of a variation of average psnr and average frame rate versus the parameter n for a sample video sequence. As shown in FIG. 5, an increase in the parameter n corresponds to an increase in the average psnr and a decrease in the average frame rate. This allows the choice of a good operating point by considering a good trade-off between the frame rate and PSNRs of the coded sequence.

Within one frame, the allocation of bits among different macroblocks is optimum, and the correlation between the quantization step size and the block energies is the higher than in the linear rate control method.

In its preferred embodiment the present invention uses a constrained trellis based rate control method in the context of video coding in the H.263 environment. It also uses several rate-distortion modeling concepts to obtain certain parameters of the process, which parameters may then be used in the trellis search. Experimental results indicate that, in its preferred embodiment, the present invention outperforms known linear rate control methods both in terms of the frame jerkiness at the output, as well as the consistency of results at the output.

In one embodiment the motion estimation and the coding control could be implemented using a multipurpose DSP like the multimedia video processor (MVP) chip made by Texas Instruments and identified by the model number TMSC80 or TMSC82. Other microprocessors which may be used to implement the invention would include, for example, the DM series of tri-media chips manufactured by Phillips, the Mpact chip manufactured by Chromatic Research, the VCP series chip manufactured by 8×8, or the MIPS 4000 series chip manufactured by MIPS. In another embodiment the entire encoding process (including H.263 encoding, decoding, coding control and motion estimation) could be implemented using an Intel Pentium chip. The Pentium chip could be programmed to perform these functions (or algorithms) in accordance with a variety of computer languages, for example higher level languages like C or C++, or Pentium processor assembly language.

The present invention could be used, for example, to implement a video telephonic application in which two windows are displayed on the screen of a local PC. One window would display an image of the calling or local party, while the other window would display the image of the called or remote party. A video camera connected to a video capture card on the PC could be used to capture and transmit the video information to the PC memory. The information could then be accessed from memory, encoded on a real time basis using an algorithm in accordance with the present invention implemented using any of the above-mentioned microprocessors, and displayed on the screen of the PC. At the same time, the encoded data could be transmitted via modem to a remote PC, while simultaneously receiving encoded data via modem from the remote PC to be displayed on the screen of the local PC.

The presently disclosed embodiments are to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A video coder for compressing and transmitting variable amounts of video data over a channel having a fixed bandwidth, the video data comprising a plurality of frames, each of the plurality of frames comprising a plurality of blocks, the video coder comprising:

a processor, and a storage medium, coupled to the processor, containing code directing operation of the processor, the processor, operating pursuant to the code contained in the storage medium, populating a trellis having a plurality of nodes, each of the plurality of nodes having a quantization parameter and a bit number associated therewith, the quantization parameter being related to motion estimation information and stochastically modeled energy data, the processor further selecting a minimum path through the trellis and a quantization parameter associated with the selected minimum path for each of the plurality of blocks.

2. The video coder of claim 1, wherein the processor further:

assigns a number of bits to each of the plurality of blocks in accordance with the selected quantization parameters, and distributes a substantially fixed number of bits among the plurality of blocks which comprise each of the plurality of frames in accordance with the selected quantization parameters, the number of bits per frame being substantially constant for each of the plurality of frames and the distribution of bits within each of the plurality of frames varying in accordance with the content of the frame.

3. The video coder of claim 1, further comprising:

a substantially fixed size transmission buffer into which each of the plurality of frames is loadable, the processor assigning a number of bits to each of the plurality of blocks substantially simultaneously with the frame being loaded into the transmission buffer.

4. The video coder of claim 1, the processor further limiting numerical differences between parameters associated with adjacent nodes of the trellis in accordance with a video coding standard.

5. The video coder of claim 1, wherein the trellis comprises a constrained trellis.

6. The video coder of claim 1, the distribution of a substantially fixed number of bits among the plurality of blocks comprising calculating a local rate and distortion value.

7. The video coder of claim 1, wherein the stochastic modeling comprises perceptual modeling.

8. The method of claim 7, wherein the trellis comprises an unconstrained trellis.

9. A method for compressing and transmitting variable amounts of video data over a channel having a fixed bandwidth, the video data comprising a plurality of frames, each of the plurality of frames comprising a plurality of blocks, the method comprising:

populating a trellis having a plurality of nodes, each of the plurality of nodes having a quantization parameter and a bit number associated therewith, the bit number associated with each node corresponding to a quantity of bits consumed in reaching that node;

selecting, for each of the plurality of blocks, a minimum path through the trellis;

and assigning a number of bits to each of the plurality of blocks in accordance with the quantization parameters associated with the minimum path, wherein, prior to the step of selecting a minimum path, at least one of the quantization parameters is varied according to motion estimation information and stochastically modeled energy data.

10. The method of claim 9, further comprising:

distributing a substantially fixed number of bits among the plurality of blocks which comprise each of the plurality of frames in accordance with the selected quantization parameters, the number of bits per frame being substantially constant for each of the plurality of frames and the distribution of bits within each of the plurality of frames varying in accordance with the content of the frame.

11. The method of claim 10, further comprising:

providing a substantially fixed size transmission buffer into which each of the plurality of frames is loadable, and wherein the step of assigning a number of bits to each of the plurality of blocks in accordance with the selected quantization parameters is performed substantially simultaneously with the frame being loaded into the transmission buffer.

12. The method of claim 9, wherein the stochastic modeling comprises perceptual modeling.

13. The method of claim 9, wherein the trellis comprises an unconstrained trellis.

14. The method of claim 9, wherein the step of selecting a minimum path through the trellis comprises selecting a minimum path in accordance with a Viterbi algorithm.

15. The method of claim 9, further comprising limiting numerical differences between parameters associated with adjacent nodes of the trellis in accordance with a video coding standard.

16. The method of claim 15, wherein the video coding standard essentially complies with the syntax of the H.261 standard of the International Telecommunications Union.

17. The method of claim 15, wherein the video coding standard essentially complies with the syntax of the H.263 standard of the International Telecommunications Union.

18. A method for compressing and transmitting variable amounts of video data over a channel having a fixed bandwidth, the video data comprising a plurality of frames, each of the plurality of frames comprising a plurality of blocks, the method comprising:

determining associated energy data for at least one of the plurality of blocks;

stochastically modeling the associated energy data;

selecting a quantizer based upon the stochastically modeled associated energy data and upon motion estimation information;

calculating a local rate and distortion value for the at least one of the plurality of blocks based on the associated quantizer;

populating a trellis having a plurality of nodes, the local rate and distortion value being associated with at least one of the nodes;

selecting a minimum path through the trellis; and assigning a number of bits to each of the plurality of blocks in accordance with the minimum path.

19. The method of claim 18, further comprising:

providing a substantially fixed size transmission buffer into which each of the plurality of frames is loadable, and wherein the step of assigning a number of bits to each of the plurality of blocks is performed substantially simultaneously with the frame being loaded into the transmission buffer.

20. The method of claim 18, wherein the stochastic modeling comprises perceptual modeling.

* * * * *